(12) United States Patent
Chiefari et al.

(10) Patent No.: US 6,376,626 B1
(45) Date of Patent: Apr. 23, 2002

(54) METHOD OF MACROMONOMER SYNTHESIS

(75) Inventors: John Chiefari; Graeme Moad; Ezio Rizzardo, all of Victoria (AU); Alexei A. Gridnev, Wilmington, DE (US)

(73) Assignee: Commonwealth Scientific and Industrial Research Organization, Victoria (AU)

( * ) Notice: Subject to any disclaimer, the term of this patent is extended or adjusted under 35 U.S.C. 154(b) by 0 days.

(21) Appl. No.: 09/403,333

(22) PCT Filed: Apr. 9, 1998

(86) PCT No.: PCT/US98/07069

§ 371 Date: Oct. 19, 1999

§ 102(e) Date: Oct. 19, 1999

(87) PCT Pub. No.: WO98/47927

PCT Pub. Date: Oct. 29, 1998

Related U.S. Application Data

(60) Provisional application No. 60/045,653, filed on Apr. 23, 1997.

(51) Int. Cl.$^7$ .................................. C08F 2/04
(52) U.S. Cl. .................. 526/75; 526/208; 526/212; 526/213; 526/220; 526/319; 526/291; 526/306; 526/303.1; 526/332; 526/227
(58) Field of Search ................. 526/208, 212, 526/213, 220, 75, 319, 291, 306, 303.1, 332, 227

(56) References Cited

U.S. PATENT DOCUMENTS

| | | | |
|---|---|---|---|
| 4,546,160 A | 10/1985 | Brand et al. .................. 526/320 |
| 5,710,227 A | * 1/1998 | Freeman et al. ............. 526/208 |
| 5,874,511 A | * 2/1999 | Rizzardo et al. ............. 526/286 |

FOREIGN PATENT DOCUMENTS

WO      97/31030      8/1997

OTHER PUBLICATIONS

Billmeyer, Jr., "Textbook of Polymer Science", John Wiley and Sons, 1984, p. 63–64.*

Rizzardo et al., Control of Polymer Structure by Chain Transfer Processes, *Macromol. Symp.*, 111, 1–11, 1996.

* cited by examiner

*Primary Examiner*—David W. Wu
*Assistant Examiner*—William Cheung
(74) *Attorney, Agent, or Firm*—Sudhir G. Deshmukh

(57) ABSTRACT

A free-radical polymerization process for making macromonomers having the structure:

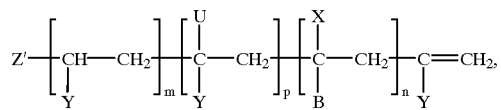

comprising contacting: (a) $CH_2=CHY$; (b) optionally, $CH_2=CXB$; and (c) free-radicals, produced from a free-radical source; in which B, U, X, Y, Z, m, n and p are defined in the text; macromonomer quality being controlled by adjusting one or more of the following variables: molar ratios of a, b and c; temperature; monomer concentration; and conversion.

12 Claims, No Drawings

METHOD OF MACROMONOMER SYNTHESIS

This application claims the benefit of provisional application No. 60/045,653 filed Apr. 23, 1997.

BACKGROUND OF THE INVENTION

This invention relates to a free-radical polymerization process for the production of branched ω-unsaturated polymers (macromonomers) of general structure 1 based on monosubstituted vinyl monomers.

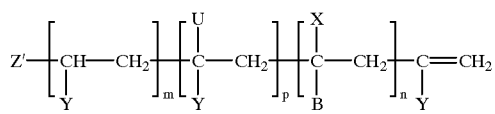

1

The synthesis of macromonomers based on monosubstituted monomers has previously been achieved by the use of addition-fragmentation chain transfer agents. For example, by polymerization of an acrylate monomer in the presence of an allyl sulfide chain transfer agent (Rizzardo et al, *Macromol. Symp.*, 15 1996, 111, 1). The synthesis of macromonomers has also been achieved by copolymerization of a monosubstituted monomer with an alpha-methylvinyl monomer, e.g., a methacrylate monomer, in the presence of a cobalt catalytic chain transfer agent. See, for example, WO 9731030. The process of the current invention does not require added reagents other than the polymerization initiator.

Polymerizations of various monomers (in particular, acrylic monomers) have previously been performed where reaction conditions have been chosen to maximize conversion and control molecular weight. For example, U.S. Pat. No. 4,546,160 describes a process for synthesizing polymers based on acrylic and methacrylic monomers where reactions are carried out at high reaction temperatures to limit molecular weight. However, no attention was paid to the design of reaction conditions to optimize the macromonomer purity or the branch structure.

U.S. Pat. No. 5,710,227 describes a synthesis of macromonomers based on monomers of acrylic acid and its salts. The process is performed at high reaction temperatures (typically >225° C.) and does not describe the conditions necessary to control the purity of the macromonomer or the extent of branch formation. Furthermore, patentees report that macromonomer purity decreases as the polymerization temperature drops below 200° C. The process is further restricted to polymers containing monomers of acrylic acid and its salts.

In conventional practice, when polymerizations are carried out at high reaction temperatures, these are typically carried out under conditions where there is a high flux of initiator-derived radicals. These conditions are unsuited for high purity macromonomer synthesis. The process disclosed herein sets out guidelines whereby the molecular weight of the macromonomer and the degree of branching in the macromonomer can be controlled. In the process described herein high purity (>90%) macromonomers are prepared at any polymerization temperature including temperatures below 100° C. The process described herein can be applied to the preparation of ω-unsaturated homopolymers of acrylates, styrene and vinyl esters. Furthermore, the process discloses guidelines for the preparation of high purity ω-unsaturated random copolymers based on one or more monosubstituted vinyl monomers or based on one or more alpha-substituted vinyl monomers.

SUMMARY OF THE INVENTION

This invention is directed to a process for the synthesis of polymers of the general formula (1):

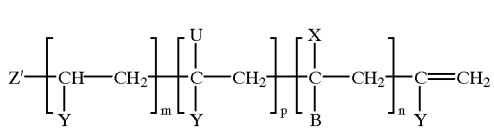

1 comprising
 (A) contacting:
  (a) $CH_2=CHY$;
  (b) optionally, $CH_2=CXB$;
  (c) free radicals, produced from a free radical source;
wherein:
 X is independently selected from the group consisting of halogen, or optionally substituted $C_1-C_4$ alkyl wherein the substituents are independently selected from the group consisting of hydroxy, alkoxy or aryloxy (OR), carboxy, acyloxy or aroyloxy ($O_2CR$), alkoxy- or aryloxy-carbonyl ($CO_2R$);
 Y is independently selected from the group consisting of R, $CO_2H$, $CO_2R$, COR, CN, $CONH_2$, CONHR, $CONR_2$, $O_2CR$, OR or halogen;
 B is selected from the group consisting of R, $CO_2H$, $CO_2R$, COR, CN, $CONH_2$, CONHR, $CONR_2$, $O_2CR$, OR, halogen or a polymer chain;
 R is selected from the group consisting of optionally substituted $C_1-C_{18}$ alkyl, $C_2-C_{18}$ alkenyl, aryl, heterocyclyl, aralkyl, alkaryl wherein the substituents are independently selected from the group that consists of epoxy, hydroxy, alkoxy, acyl, acyloxy, carboxy (and salts), sulfonic acid (and salts), alkoxy- or aryloxy-carbonyl, isocyanato, cyano, silyl, halo, and dialkylamino;
 Z is selected from the group consisting of H and a free radical initiator-derived fragment of optionally substituted alkyl, cycloalkyl, aryl, aralkyl, alkaryl, organosilyl, alkoxyalkyl, alkoxyaryl, hydroxy, hydroperoxy, alkylperoxy, alkoxy, aroyloxy groups wherein substituent(s) are selected from R, OR, $O_2CR$, halogen, $CO_2H$ (and salts), $CO_2R$, CN, $CONH_2$, CONHR, $CONR_2$, sulfate,

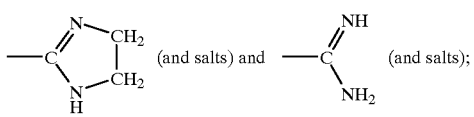

$m \geq 1$;
$n \geq 0$;
$p \geq 0$;
and when one or both of m and n are greater than 1, the repeat units are the same or different;
the $[CH_2-CUY]_p$ moiety contains branch point, U, and is derived from structure (1) whereby U is of random structure (2):

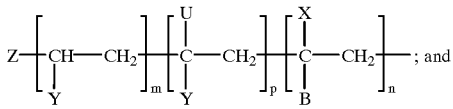

(B) controlling polymer quality by adjusting the following variables:
  (i) increasing the proportion of vinyl terminated polymer by increasing the molar ratio of (a)/(b);
  (ii) increasing the proportion of vinyl terminated polymer by decreasing the molar ratio of (c)[(a)+(b)];
  (iii) controlling the degree of branching (value of p) as follows:
    (d) decreasing p by increasing temperature;
    (e) decreasing p by decreasing monomer concentration;
    (f) increasing p by increasing conversion;
  (iv) controlling the molecular weight of the polymer as follows:
    (g) decreasing molecular weight by decreasing monomer concentration; and
    (h) decreasing molecular weight by increasing temperature.

The preferred proportion of vinyl terminated polymer is ≧50 percent, more preferably, greater than 70 percent. The preferred degree of branching is, on average, ≦10 branches per chain. The preferred degree of polymerization (m+n+p) is from 1 to about 500.

DETAILS OF THE INVENTION

We have found that macromonomers (1) can be synthesized by conducting a polymerization of monosubstituted monomer(s) with appropriate choice of reaction conditions. Monomers $CH_2=CHY$ and $CH_2=CXB$ are polymerizable or copolymerizable monomers. As one skilled in the art would recognize, the choice of monomers is determined by their steric and electronic properties. The factors which determine polymerizability and copolymerizability of various monomers are well documented in the art. For example, see: Greenley, in Polymer Handbook 3rd Edition (Brandup and Immergut, Eds.) Wiley, N.Y., 1989 p II/53.

Preferred monosubstituted monomers ($CH_2=CHY$) are one or more of the following: methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional acrylates selected from glycidyl acrylate, 2-hydroxyethyl acrylate, hydroxypropyl acrylate (all isomers), hydroxybutyl acrylate (all isomers), diethylaminoethyl acry late, triethyleneglycol acrylate, N-tert-butyl acrylamide, N-n-butyl acrylamide, N-methylol acrylamide, N-ethylol acrylamide, vinyl benzoic acid (all isomers), diethylamino styrene (all isomers), p-vinyl benzene sulfonic acid, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate, vinyl chloride, vinyl fluoride, vinyl bromide and propene.

Preferred disubstituted monomers $CH_2=CXB$ are one or more of the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, glycidyl methacrylate, 2-hydroxyethyl methacrylate, hydroxypropyl methacrylate (all isomers), hydroxybutyl methacrylate (all isomers), diethylaminoethyl methacrylate, triethyleneglycol methacrylate, trimethoxysilylpropyl methacrylate, triethoxysilylpropyl methacrylate, tributoxysilypropyl methacrylate, dimethoxymethylsilylpropyl methacrylate, diethoxymethylsilylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, disopropoxysilylpropyl methacrylate, itaconic anhydride, itaconic acid, methacrylamide, N-tert-butyl methacrylamide, N-n-butyl methacrylamide, N-methylol methacrylamide, N-ethylol methacrylamide, alpha-methyl styrene, alphamethylvinyl benzoic acid (all isomers), diethylamino alpha-methylstyrene (all isomers) and isobutylene.

The source of initiating radicals can be any suitable method of generating free radicals such as the thermally induced homolytic scission of a suitable compound(s) (thermal initiators such as peroxides, or azo compounds), the spontaneous generation from monomer (e.g., styrene), redox initiating systems, photochemical initiating systems or high energy radiation such as electron beam, X- or γ-radiation. The initiator should also have the requisite solubility in the reaction medium and monomer mixture.

Thermal initiators are chosen to have an appropriate half-life at the temperature of polymerization. These initiators can include one or more of the following compounds: 2,2'-azobis(isobutyronitrile), 2,2'-azobis(2-cyano-2-butane), dimethyl 2,2'-azobisdimethylisobutyrate, 4,4'-azobis(4cyanopentanoic acid), 1,1'-azobis(cyclohexanecarbonitrile), 2-(t-butylazo)-2-cyanopropane, 2,2'-azobis[2-methyl-N-(1,1)-bis(hydoxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl) ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite, cumyl hydroperoxide, t-butyl hydroperoxide.

While not wishing to be limited by any particular mechanism, it is believed that the process for macromonomer formation occurs as summarized in Scheme 1 and involves abstraction of a methine backbone hydrogen to give a radical of structure 3. Such chain transfer to polymer in acrylate polymerization is known (Lovell et al, Polym. Commun., 1991, 32, 98). However, the art would suggest that this process leads to formation of a branched polymer. We provide a set of conditions whereby formed radical 3 undergoes fragmentation to give a macromonomer and a new propagating species.

Scheme 1

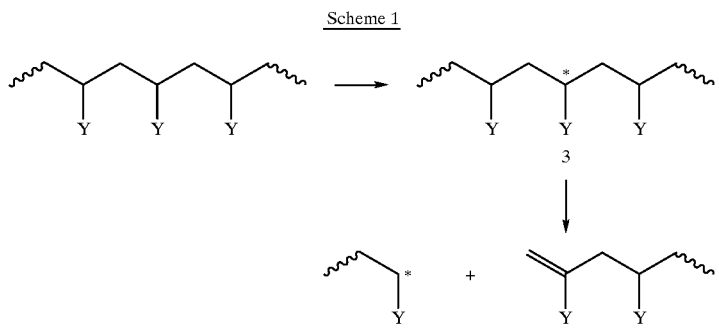

Abstraction of a hydrogen from the backbone can, in principle, occur by either an intermolecular (transfer to polymer) or intramolecular (backbiting) process. The mechanism of backbone hydrogen abstraction by backbiting is shown in Scheme 2. This mechanism best accounts for the observed manner in which molecular weight varies with conversion (see Example 1). In this mechanism, two possible fragmentation routes exist. In principle, fragmentation can occur by either pathway A or pathway B leading to trimer macromonomer 4 (path A) or dimeric propagating radical 5 (path B).

Scheme 2

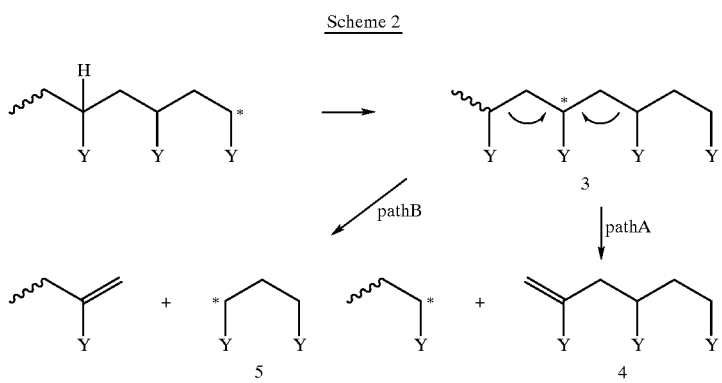

Under the conditions of the claimed process, if all radicals 3 (formed by any mechanism) undergo fragmentation, then the molecular weight of the polymer will be determined by the incidence of backbone abstraction. In the case of ethylene polymerization, it is known that high reaction temperatures favor backbiting. A similar situation is likely to apply in acrylate polymerization. Consequently, high reaction temperatures will increase the incidence of backbone methine hydrogen abstraction and increase the incidence of fragmentation. This has the overall effect of decreasing the molecular weight of the polymer (see Example 7). Similarly, lower monomer concentration reduces the propagation rate of polymerization providing an opportunity for an increase in the incidence of backbone hydrogen atom abstraction and hence fragmentation. As a consequence, lower molecular weights are observed (see Examples 10 and 11).

To summarize, control over molecular weight can be obtained by: (a) controlling the reaction temperature. A higher reaction temperature will give a lower molecular weight. Using the process described herein, macromonomers have been prepared at polymerization temperatures of 60° C. (see Example 9, entry 2). Preferably, the polymerization temperature should be above 80° C. (see Example 9, entry 1) and most preferably above 100° C. (see Example 4, entry 3); and by (b) controlling the monomer concentration. A lower monomer concentration will give a lower molecular weight.

For polymerizations carried out at high temperatures the experimental results indicate fragmentation of radicals 3 dominates over bimolecular reaction with monomer even with relatively high monomer concentrations. Compare the results in Example 10 and Example 11 where lower molecular weights are obtained at 170° C. (Example 11) compared with 150° C. (Example 10). If lower reaction temperatures are employed there will be competition between fragmentation of radical 3 and reaction of radical 3 with monomer. The result is a polymer with a higher degree of branching for lower reaction temperatures (see Example 12). Furthermore, by increasing the monomer concentration the rate of the bimolecular reaction with radical 3 will increase giving rise to polymers with a higher degree of branching (see Example 13). The branched product can nonetheless still be a macromonomer. As the conversion to macromonomer increases, there is a greater likelihood that macromonomer will react giving a polymer with a higher degree of branching (see Example 14).

To summarize, the degree of branching can be controlled by: (a) controlling the reaction temperature. Higher reaction temperatures give a lower degree of branching; (b) adjusting the monomer concentration. A lower monomer concentration leads to a lower degree of branching; (c) the degree of conversion of monomer to polymer. The degree of branching can be increased by increasing the degree of conversion of monomer to polymer.

The macromonomers formed by the process of the present invention are likely to be reactive under the conditions of the experiment. However, the initial product is another radical of structure 3 and under the preferred reaction conditions these radicals will most likely undergo fragmentation. This process thus does not lead to impurity formation. The reaction offers some opportunity for chain length equilibration. Thus, these polymerizations can give narrower polydispersities than would otherwise be observed.

It is important in designing the reaction conditions to use an initiator concentration (radical flux) such that the number of chains formed by chain termination processes (i.e., combination, disproportionation) are small with respect to those resulting in macromonomer formation.

Macromonomer purity will in part be determined by the initiator concentration and the rate of generation of initiator-derived radicals which in turn determines the kinetic chain length (the length of polymer chain that would be formed in the absence of chain transfer).

$$\text{Maximum purity} = \frac{(\text{moles of polymer formed}) - (\text{moles initiator derived radicals})}{(\text{moles of polymer formed})}$$

moles polymer formed=(grams monomer converted)/(MW of polymer)

moles initiator derived radicals (moles of initiator consumed ×2)×initiator efficiency.

The acceptable range of initiator concentrations to give a required purity of macromonomer depends on the molecular weight of the macromonomer. The above expression requires that there be no transfer to monomer, solvent, initiator, etc. If these occur, then the purity will be lower. The preferred initiator concentration relative to monomer is less than 1 mol percent, more preferably, less than 0.1 mol percent.

If the mechanism of macromonomer formation involves intermolecular abstraction from polymer (rather than backbiting) there will also be up to an equivalent of non-macromonomer product of structure 6 formed the observation that macromonomer purity is >90% under the optimal conditions suggests that this pathway is of lesser importance.

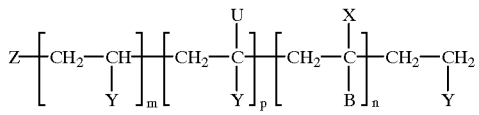

6

Thus, in general, macromonomer purity is increased by decreasing the molar ratio of initiator to total monomer(s) (see Example 4).

The mechanisms and general improvement conditions highlighted thus far will also apply in copolymerizations of monosubstituted vinyl monomers (e.g., acrylates, vinyl esters, styrene, and the like) with other monosubstituted vinyl monomers (see Examples 15, 16, 23 to 26). In examples of copolymers prepared with more than one monosubstituted vinyl monomer, macromonomers with more than one type of end group will be obtained. For example, copolymerizing butyl acrylate with styrene under the conditions specified in the present invention will give ω-unsaturated polymers possessing BMA derived end groups 7 and AMS derived end groups 8 (see Example 15 for $^1$H-NMR).

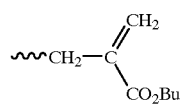

7

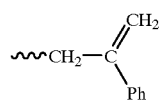

8

The mechanisms and general improvement conditions highlighted thus far will also apply in copolymerizations of monosubstituted vinyl monomers (e.g., acrylates, vinyl esters, styrene, and the like) with other alpha-substituted vinyl monomers. In examples of copolymers prepared with one or more alpha-substituted vinyl monomer(s), ω-unsaturated polymers are formed, possessing vinyl end groups derived from the monosubstituted vinyl monomers (see Examples 17 to 19, 27, 28). Under the disclosed conditions of the claimed process, the abstraction of a hydrogen atom from the backbone can not occur from the alpha-substituted monomer unit, it can only occur from the monosubstituted monomer unit. This gives rise to a radical of general structure 9 which is likely to fragments as shown in Scheme 3.

Scheme 3

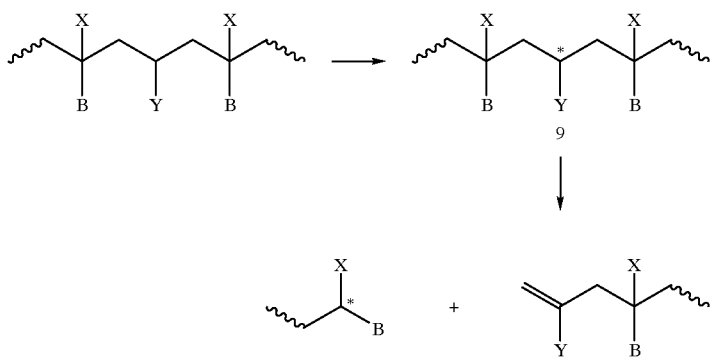

This will lead to macromonomer bearing an end group derived from the monosubstituted vinyl monomer. This is in contrast to the disclosure in WO 97/31030 where the ω-unsaturated polymers have end groups derived exclusively from the alpha-substituted vinyl monomer.

Furthermore, in examples of copolymers prepared with one or more alpha-substituted vinyl monomer(s), the purity of the formed ω-unsaturated polymers will depend on the relative amount of alpha-substituted vinyl monomer(s) used (see Examples 17 to 19). As the relative amount of alpha-substituted vinyl monomer units increase in the polymer chain, there is less likelihood of backbone hydrogen atom abstraction. This has the effect of increasing molecular weight of the polymer and as such will increase the likelihood of the propagating radical being involved in termination processes leading to dead polymer and thus decrease the purity of the formed macromonomer.

In copolymers composed of monosubstituted vinyl monomer(s) and alpha-substituted vinyl monomer(s), the purity of the copolymer macromonomer can be affected by the relative amount of alpha-substituted vinyl monomer(s). As the proportion of alpha-substituted vinyl monomer(s) decreases, purity of the copolymer macromonomer increases.

In an extension of this process, the disclosed conditions are used to prepare ω-unsaturated homopolymers of general structure 10 containing one type of vinyl end group based on the monosubstituted vinyl monomer.

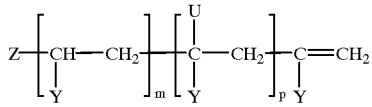

10

In a further extension of this process, ω-unsaturated copolymers of general structure 11 composed of one monosubstituted vinyl monomer and one or more alpha-substituted vinyl monomer can be prepared which possesses a vinyl end group derived exclusively from the monosubstituted vinyl monomer.

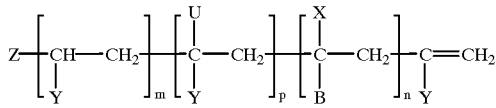

11

Macromonomers of structure 1 have application in the synthesis of block and graft copolymers. For examples of this utility, see U.S. Pat. No. 5,362,826 and WO 96/15157. "One pot" procedures for sequential macromonomer and block or graft copolymer synthesis are also within the scope of this invention.

EXAMPLES

General Experimental Conditions

In all instances, monomers were purified (to remove inhibitors) and flash distilled immediately prior to use. Quantities of initiators were calculated based on total monomer amounts. For polymerizations performed in ampoules, degassing was accomplished by repeated freeze-evacuate-thaw cycles. Once degassing was complete, the ampoules were flame sealed under vacuum and completely submerged in an oil bath at the specified temperature for the specified times. All reaction mixtures were worked up by removing volatiles in vacuo. Heating under microwave irradiation was performed in a batch reactor (for description of apparatus see: Rainor, K. D., Strauss, C. R., Thorn, T. S., and Trainor, R. W. PCT-AU94-00659, 1994; Rainor, K. D., Strauss, C. R., Trainor, R. W., and Thorn, T. S., *J. Org. Chem.*, 60, 2456, (1995)). The percentage conversions were calculated gravimetrically unless otherwise indicated.

The structures of polymers and graft copolymers were verified by application of appropriate chromatographic and spectroscopic methods. Gel permeation chromatography (GPC) was used to establish the molecular weight and molecular weight distribution (polydispersity) of the polymers. Unless otherwise specified, a Waters Associates liquid chromatograph equipped with differential refractometer and $10^6$, $10^5$, $10^4$, $10^3$, 500 and 100 Å Ultrastyragel columns was used. Tetrahydrofuran (flow rate of 1.0 mL/min) was used as eluent. The molecular weights are provided as polystyrene equivalents. The terms $M_n$, $M_w$ and $M_w/M_n$ (PD) indicate the number and weight average molecular weights and the 13 polydispersity respectively.

Macromonomer purity was calculated from the expression:

$$[1-(|M_n(\text{calc})-M_n(obs)|/M_n(obs))] \times 100\%$$

$M_n$ (obs) is the $M_n$ obtained from GPC measurement.

$M_n$ (calc) is determined from the $^1$H-NMR spectrum of the polymer.

The poly(acrylic acid) macromonomer was characterized as its poly(methyl acrylate) derivative by methylating the poly(acrylic acid) macromonomer as follows:

In a Young's vessel, poly(acrylic acid) macromonomer was dissolved in mehanol (4 mL/0.1 g). This was followed by the addition of (25 wt % in methanol) tetramethylammonium hydroxide (1.1 mol equivalents) and methyl iodide (2 mol equivalents). The vessel was sealed and heated at 100° C. for 2 hours. The reaction mixture was evaporated to dryness and the residue dissolved in ethyl acetate. The organic solution was washed with water and saturated sodium chloride solution, then dried over anhydrous magnesium sulfate. The organic solution was evaporated to give poly(methyl acrylate) as an oily residue.

The $^{13}$C-NMR and $^1$H-NMR spectra of macromonomers were run in deuterochloroform unless otherwise stated. The $^1$H-NMR chemical shift data for poly(butyl acrylate) macromonomer is as follows unless otherwise stated; $^1$H-NMR (CDCl$_3$): δ6.3 and 5.55, broad singlets, 2H, vinylic H; 4.0, broad singlet, 2H, OCH$_2$.

In the following Examples, VAZO® 52 is 2,2'-azobis-(2,4-dimethylvaleronitrile); VAZO® 67 is 2,2'-azobis(2-methylbutyronitrile); and VAZO® 88 is 1,1'-azobis (cyanocyclohexane). VR 110 is 2,2'-azobis(2,4,4-trimethylpentane) and VR 160 is azobutane.

Example 1

Preparation of poly(butyl acrylate) (BA) macromonomer (macro) to high conversion under batch polymerization conditions.

A reaction mixture comprising of butyl acrylate (1 g) n-butyl acetate (9 g) and VR160 (100 ppm) was placed into each of six ampoules. The solutions were degassed, the ampoules sealed and heated at 150° C. for the indicated times.

TABLE 1

BA macro in n-butyl acetate
(10 wt % BA) at 150° C. with VR160 (100 ppm).

| Entry | Time (hrs) | $M_n$ | $M_w$ | PD | % Conv. | Macro purity |
|---|---|---|---|---|---|---|
| 1 | 0.5 | 1942 | 4189 | 2.16 | 28 | >90% |
| 2 | 1.5 | 1655 | 3141 | 1.90 | 37 | >90% |
| 3 | 2.5 | 1670 | 3082 | 1.85 | 51 | >90% |
| 4 | 4 | 1633 | 2938 | 1.80 | 67 | >90% |
| 5 | 6 | 1591 | 2812 | 1.77 | 75 | >90% |
| 6 | 8 | 1557 | 2749 | 1.77 | 79 | >90% |

Example 2

Preparation of polystyrene (STY)macromonomer to high conversion under batch polymerization conditions.

A mixture of styrene (0.5 g), n-amyl acetate (9 g) and VR-160 (1000 ppm) was placed in an ampoule. The solution was degassed, the ampoule sealed and heated at 170° C. for 7 hours. $^1$H-NMR (acetone-d6): δ7.6–7.2, multiplet, 5H, ArH; 5.2 and 4.8, broad singlets, 2H, vinylic H.

TABLE 2

Sty macro (5 wt % monomer) to high conversion with VR160
(1000 ppm) in nAmAc at 170° C.

| Entry | Time (hrs) | $M_n$ | $M_w$ | PD | % Conv | Macro purity |
|---|---|---|---|---|---|---|
| 1 | 7 | 3092 | 5928 | 1.92 | 99 | >90% |

Example 3

Preparation of poly(vinyl benzoate) (VBz) macromonomer under batch polymerization conditions using a microwave reactor.

A stock solution of vinyl benzoate (10 g) in N,N-dimethylfornamide (90 g) and cumene hydroperoxide (1000 ppm) was placed in a reactor vessel and heated to 220° C. under microwave irradiation for 30 min.

$^1$H-NMR (acetone-d6):δ8.0–7.5, multiplet and 7.4–6.9, multiplets, 5H, ArH, 5.5 –5.4 and 5.35–5.1, broad singlets, vinylic H and backbone methines.

TABLE 3

Preparation of VBz macro. 10 wt. % monomer in DMF
at 220° C. with cumene hydroperoxide (1000 ppm).

| Entry | Time (hrs) | $\overline{M}_n$ | $\overline{M}_w$ | P.D. | % Conv. | Macro purity |
|---|---|---|---|---|---|---|
| 1 | 30 | 903 | 1243 | 1.37 | 14.3 | >50%[1] |

[1]Due to signal overlap of vinylic H's with backbone methines, an accurate calculation of macro purity is not possible.

Example 4

Preparation of poly(butyl acrylate) macromonomer under batch polymerization conditions-dependence of macro purity on initiator concentration.

For entries 1 and 2

A reaction mixture comprising butyl acrylate (0.5 g), toluene (9.2 g) and VAZO® 88 (9000 ppm) was placed into each of two ampoules. The solutions were degassed, the ampoules sealed and heated at 110° C. for the indicated times.

For Entry 3

A mixture of n-butyl acrylate (0.5 g), toluene (10 g) and VAZO® 88 (100 ppm) was placed in an ampoule. The solution was degassed, the ampoule sealed and heated at 110° C. for 70 min.

TABLE 4

BA in toluene (5 wt % monomer)
with VAZO ® 88 at 110° C. Initiator.

| Entry | Time (hrs) | [Initiator] (ppm) | $M_n$ | PD | % Conv | Macro purity |
|---|---|---|---|---|---|---|
| 1 | 10 | 9000 | 2056 | 1.70 | 8.6 | ~75% |
| 2 | 40 | 9000 | 2131 | 1.73 | 36.2 | ~75% |
| 3 | 70 | 100 | 2281 | 1.69 | 3 | >90% |

Example 5

Preparation of poly(butyl acrylate) macromonomer under batch polymerization conditions—effect of conversion on macromonomer purity.

A reaction mixture comprising butyl acrylate (1 g), n-butyl acetate (3 g) and VR110 (400 ppm) was placed into each of 4 ampoules. The ampoules were degassed, sealed and heated at 150° C. for the indicated times.

TABLE 5

Effect of conversion on purity of poly(butyl acrylate) macromonomer.

| Entry | Time (hrs) | $M_n$ | $M_w$ | PD | % Conv. | Macro purity |
|---|---|---|---|---|---|---|
| 1 | 5 | 4595 | 11,454 | 2.49 | 28.3 | >95% |
| 2 | 10 | 4087 | 10,322 | 2.53 | 49.4 | >95% |
| 3 | 15 | 3862 | 9965 | 2.58 | 58.3 | >95% |
| 4 | 25 | 3746 | 9810 | 2.62 | 72.3 | >95% |
| 5 | 40 | 3538 | 9749 | 2.76 | 82.2 | >95% |

Example 6

Preparation of poly(methyl acrylate) (MA) macromonomer under batch polymerization conditions in a microwave reactor.

A stock solution of methyl acrylate (15 g) in N,N-dimethylformamide (44.6 g) and cumene hydroperoxide (100 ppm) was placed in a reactor vessel and heated to 240° C. under microwave irradiation for 20 min.

$^1$H-NMR: δ6.2 and 5.55, broad singlets, 2H, vinylic H; 3.65, broad singlet, 3H, OCH$_3$.

TABLE 6

MA polymerization in DMF (25 wt % MA) at
240° C. with cumene hydroperoxide (100 ppm).

| Entry | Time (hrs) | $M_n$ | PD | % Conv | Press. MPa | Macro purity |
|---|---|---|---|---|---|---|
| 1 | 20 | 1092 | 2.71 | 58 | 0.72 | >90% |

Example 7

Preparation of poly(butyl acrylate) macromonomer under batch polymerization conditions—effect of reaction temperature on number average molecular weight.

For Entry 1

A reaction mixture comprising butyl acrylate (1 g) n-butyl acetate (3 g) and VR110 (400 ppm) was placed into an ampoule. The ampoule was degassed, sealed and heated at 150° C. for the indicated times.

For Entries 2–4

A stock solution of butyl acrylate (15 g) in n-butyl acetate (44.6 g) and cumene hydroperoxide (100 ppm) was placed in a reactor vessel and heated to the indicated temperatures under microwave irradiation for the indicated length of time.

TABLE 7

BA in nBuAc (25 wt % BA) with cumene hydroperoxide or VR110

| Entry | Temp ° C. | Time (min) | $M_n$ | PD | % Conv | Press. MPa | Macro purity |
|---|---|---|---|---|---|---|---|
| 1 | 150 | 20 | 3677 | 2.58 | 70 | — | >95% |
| 2 | 200 | 20 | 1810 | 2.49 | 94 | 4.5 | >90% |
| 3 | 220 | 15 | 1460 | 2.70 | 87 | 0.6 | >95% |
| 4 | 240 | 20 | 1303 | 1.83 | 100 | 0.3 | >85% |

Example 8

Preparation of poly(butyl acrylate) macromonomer under batch polymerization conditions—polymerizations performed in various solvents.

A stock solution of butyl acrylate (15 g) in the indicated solvent (44.6 g) and cumene hydroperoxide (100 ppm) was placed in a reactor vessel and heated to 220° C. under microwave irradiation for the indicated length of time.

TABLE 8

BA polymerization (25 wt % BA) with cumene hydroperoxide (100 ppm).

| Entry | Solvent | Time (min) | $M_n$ | PD | % Conv | Press. MPa | Macro purity |
|---|---|---|---|---|---|---|---|
| 1 | nBuAc | 15 | 1459 | 2.70 | 87 | 0.6 | 100% |
| 2 | NMF[1] | 20 | 1303 | 1.83 | 71 | 1.7 | >95% |
| 3 | DMF | 15 | 1460 | 2.70 | 87 | 0.6 | >95% |
| 4 | nBuOH[2] | 20 | 1163 | 1.78 | 96 | 0.11 | >90% |

[1]N-methylformamide
[2]n-butanol

Example 9

Preparation of poly(butyl acrylate) macromonomer under batch polymerization conditions—dependence of macromonomer purity on reaction temperature and monomer concentration.

For 80° C.

A mixture of butyl acrylate (0.5 g), toluene (10 g) and VAZO®52 (100 ppm) was placed in an ampoule. The reaction mixture was degassed, the ampoule sealed and heated to 80° C. for 90 min.

For 60° C.

A mixture of butyl acrylate (0.3 g), toluene (10 g) and VAZO®52 (200 ppm) was placed in an ampoule. The reaction mixture was degassed, the ampoule sealed and heated to 60° C. for 3 hours.

TABLE 9

BA in toluene VAZO ® 52 (200 ppm).

| Entry | [Monomer] wt. | Temp ° C. | $M_n$ | PD | % Conv | Macro purity |
|---|---|---|---|---|---|---|
| 1 | 1.5 | 80 | 1756 | 1.96 | 6.4 | >95% |
| 2 | 4.5 | 60 | 26,579 | 1.77 | 10 | ~60% |

These results also show the effect of polymer molecular weight on macromonomer purity. The longer the kinetic chain length the greater the opportunity for side reactions (i.e., impurity formation) to occur.

Example 10

Preparation of poly(butyl acrylate) macromonomer under batch polymerization conditions—dependence of number average molecular weight on monomer concentration.

Two ampoules each of butyl acrylate in n-butyl acetate at 25, 40, 60, 80 and 100 wt. % monomer concentrations were prepared. To the ampoules were added VR110 (100 ppm). The ampoules were degassed, sealed and heated at 150° C. for 10 and 20 minutes.

TABLE 10

Batch polymerization of BA at different monomer concentration using 100 ppm VR110 at 150° C. as initiator.

| Entry | [BA] (wt. %) | React Time (min) | Temp (° C.) | $M_n$ | PD | % Conv | Macro purity |
|---|---|---|---|---|---|---|---|
| 1 | 25 | 10 | 150 | 2358 | 2.39 | 35 | >90% |
| 2 | " | 20 | " | 1977 | 2.39 | 65 | >90% |
| 3 | 40 | 10 | 150 | 6383 | 2.55 | 71 | >90% |
| 4 | " | 20 | " | 4489 | 2.95 | 82 | >90% |
| 5 | 60 | 10 | 150 | 10,355 | 2.67 | >90% | >90% |
| 6 | " | 20 | " | 10,512 | 2.50 | >90% | >90% |
| 7 | 80 | 10 | 150 | 13,135 | 3.75 | 73 | >80% |
| 8 | " | 20 | " | 13,923 | 3.32 | 96 | >80% |
| 9 | 100 | 10 | 150 | 14,822 | 4.66 | 63 | >70% |
| 10 | " | 20 | " | 16,332 | 3.99 | 67 | >70% |

Example 11

Preparation of poly(butyl acrylate) macromonomer under batch polymerization conditions—dependence of number average molecular weight on monomer concentration.

Two ampoules each of butyl acrylate in n-butyl acetate at 25, 40, 60, 80 and 100 wt. % monomer concentrations were prepared. To the ampoules were di tert-butyl peroxide (100 ppm). The ampoules were degassed, sealed and at 170° C. for 10 and 20 minutes.

TABLE 11

Batch polymerization of BA at different monomer concentration using 100 ppm Di-t-butyl peroxide at 170° C. as initiator.

| Entry | [BA] (wt. %) | React Time (min) | Temp (° C.) | $M_n$ | PD | % Conv | Macro purity |
|---|---|---|---|---|---|---|---|
| 1 | 25 | 10 | 170 | 2094 | 2.38 | 66 | >90% |
| 2 | " | 20 | " | 1974 | 2.37 | 74 | >90% |
| 3 | 40 | 10 | 170 | 3357 | 3.6 | 96 | >90% |
| 4 | " | 20 | " | 3396 | 5.2 | ~100 | >90% |
| 5 | 60 | 10 | 170 | 4445 | 4.0 | ~100 | >90% |
| 6 | " | 20 | " | 4400 | 5.18 | ~100 | >90% |
| 7 | 80 | 10 | 170 | 4785 | 7.46 | 99 | >90% |
| 8 | " | 20 | " | 5877 | 6.74 | ~100 | >90% |
| 9 | 100 | 10 | 170 | 6641 | 7.23 | 83 | >90% |
| 10 | " | 20 | " | 7257 | 7.3 | 85 | >90% |

Example 12

Preparation of polyacrylate macromonomers-dependence of degree of branching on temperature.

For Entry 1

A reaction mixture comprising butyl acrylate (1 g), n-butyl acetate (3 g) and VR110 (400 ppm) was placed into an ampoule. The ampoule was degassed, sealed and heated at 150° C. for 10 min.

For Entry 2

A stock solution of methyl acrylate (15 g) in N,N-dimethylformamide (44.6 g) and cumene hydroperoxide (100 ppm) was placed in a reactor vessel and heated to 240° C. under microwave irradiation for 20 min.

TABLE 12

Branching in acrylate macromonomers prepared at different temperatures.

| Entry | Monomer & conc. | Temp. °C. | $M_n$ | PD | % Conv. | No. branch points/macro |
|---|---|---|---|---|---|---|
| 1 | 25 wt % BA | 150 | 4087 | 2.53 | 50 | 1.4 |
| 2 | 25 wt % MA | 240 | 1092 | 2.71 | 58 | 0.3 |

Example 13

Preparation of poly(butyl acrylate) macromonomers-dependence of degree of branching on monomer concentration.

For Entry 1

A reaction mixture comprising butyl acrylate (1.28 g), n-butyl acetate (8.87 g) and VR160 (1000 ppm) was placed into an ampoule. The ampoule was degassed, sealed and heated at 150° C. for 16 hours.

For Entries 2–6

Poly(butyl acrylate) macromonomers were prepared as in Example 12 (entry 2) and Example 10 (entries 3–6).

TABLE 13

BA macro prepared at 150° C. in nBuAc with VR110.

| Entry | % conv. | BA conc. wt. % | $M_n$ | PD | Macro purity | No. branch points |
|---|---|---|---|---|---|---|
| 1 | 8 | 13 | 1802 | 1.68 | >95% | 0.9 |
| 2 | 50 | 25 | 4087 | 2.53 | >95% | 1.4 |
| 3 | 82 | 40 | 4469 | 2.90 | >90% | 2.0 |
| 4 | 90 | 60 | 10,512 | 2.50 | >90% | 3.8 |
| 5 | 96 | 80 | 13,923 | 3.32 | >90% | 4.2 |
| 6 | 67 | 100 | 16,332 | 3.99 | >90% | 4.8 |

Example 14

Preparation of polyacrylate macromonomers-dependence of degree of ing on conversion.

Poly(butyl acrylate) macromonomers were prepared as in Example 5.

TABLE 14

BA macro prepared at 150° C., 25 wt % BA, nBuAc with VR110.

| Entry | % conv. | $M_n$ | PD | Macro purity | No. branch points |
|---|---|---|---|---|---|
| 1 | 50 | 4087 | 2.53 | >95% | 1.4 |
| 2 | 82 | 3538 | 2.76 | >95% | 1.8 |

Example 15

Preparation of acrylate macromonomers-dependence of degree of branching on comonomer ratio.

For Entry 1

A mixture of butyl acrylate (0.13 g), styrene (0.94 g), n-butyl acetate (8.8 g) and VR-110 (200 ppm) was placed in an ampoule. The reaction mixture was degassed, the ampoule sealed and heated at 150° C. for 40 min.

For Entry 2

A mixture of butyl acrylate (1.15 g), styrene (0.1 g), n-butyl acetate (8.8 g) and VR-110 (200 ppm) was placed in an ampoule. The reaction mixture was degassed, the ampoule sealed and heated at 150° C. for 40 min.

$^1$H-NMR (acetone-d6):δ7.4–6.95, broad multiplet, 5H, ArH; 6.15 and 5.5, broad singlets, 2H, BMA vinylic H; 5.3 and 5.05, broad singlets 2H, AMS vinylic H; 4.0, broad singlet, 2H, OCH$_2$.

For Entry 3

Polybutyl acrylate) macromonomer was prepared as in Example 12.

TABLE 15

BA/Sty macro prepared at 150° C., for 40 min in nBuAc with 200 ppm VR110.

| Entry | Monomer conc. (wt. %) | BA/Sty | $M_n$ | PD | % Conv | % Sty inc. | No. branch points/macro |
|---|---|---|---|---|---|---|---|
| 1 | 10.6 | 1/10 | 6343 | 2.05 | 20 | 63 | 0.2[1] |
| 2 | 12 | 10/1 | 2340 | 2.62 | 18 | 23 | 0.54[1] |
| 3 | 25 | 100 | 3538 | 2.76 | 82 | — | 0.9 |

[1]Based on branching from BA units only. Branchpoints from styrene have not been assigned by $^{13}$C-NMR.

Example 16

Preparation of fuctional copolymer macromonomers-dependence of degree of branching on comonomer ratio.

For Entry 1

A mixture of butyl acrylate (0.64 g), hydroxyethyl acrylate (0.58 g) (HEA), n-butyl acetate (8.8 g) and VR-110 (200 ppm) was placed in an ampoule. The reaction mixture was degassed, the ampoule sealed and heated at 150° C. for 40 min.

For Entry 2

A mixture of butyl acrylate (1.15 g), hydroxyethyl acrylate (0.17 g), n-butyl acetate (8.8 g) and VR-110 (200 ppm) was placed in an ampoule. The reaction mixture was degassed, the ampoule sealed and heated at 150° C. for 40 min.

$^1$H-NMR: δ6.25–6.15, broad multiplet, 1H, vinylic H; 5.65–5.5, broad singlet, H, vinylic H; 3.9–4.4, broad singlet, OCH$_2$; 3.9–3.55, broad singlet, HOCH$_2$.

For Entry 3

Poly(butyl acrylate) macromonomer was prepared as in Example 12.

TABLE 16

BA/HEA macro prepared at 150° C., for 40 min in nBuAc with 200 ppm VR110.

| Entry | Monomer conc. (wt. %) | BA/HEA | $M_n$ | PD | % Conv. | % HEA inc. | No. branch points/macro |
|---|---|---|---|---|---|---|---|
| 1 | 12 | 1/1 | 3824 | 2.33 | 59 | 57 | 2 |
| 2 | 12.8 | 10/1 | 2495 | 2.03 | 65 | 12 | 1.2 |
| 3 | 25 | 100% BA | 1950 | 2.30 | 65 | — | 0.9 |

Example 17

Preparation of functional copolymer macromonomers-dependence of macromonomer purity on ratio of monomer/comonomer.

For Entries 1 and 2

A mixture of butyl acrylate (1.28 g), glycidyl methacrylate (0.15 g) (GMA), n-butyl acetate (6.9 g) and VR-110 (200 ppm) was placed in each of two ampoules. The reaction mixtures were degassed, the ampoules sealed and heated at 150° C. for 10 min and 40 min.

For Entries 3 and 4

A mixture of butyl acrylate (0.64 g), glycidyl methacrylate (0.71 g), n-butyl acetate (5.0 g) and VR-110 (200 ppm) was placed in each of two ampoules. The reaction mixtures were degassed, the ampoules sealed and heated at 150° C. for 10 min and 40 min.

$^1$H-NMR: δ6.25–6.15, broad multiplet, vinylic H; 5.65–5.5, broad multiplet, vinylic H; 4.5–4.15, broad multiplet, OCH$_2$; 4.1–3.65, broad multiplet, OCH$_2$; 3.25, broad singlet, CHO; 2.85, broad singlet, CHO; 2.6, broad singlet, CHO.

TABLE 17

High temperature polymerization of BA/GMA with VR-110 (200 ppm) in bBuAc at 150° C.

| Entry | Time (min) | BA/GMA | M$_n$ | PD | % Conv | % GMA inc. | Macro purity |
|---|---|---|---|---|---|---|---|
| 1 | 10 | 10/1 | 3311 | 2.36 | 43 | 11 | >95% |
| 2 | 40 | 10/1 | 2687 | 2.31 | 69 | 8 | >95% |
| 3 | 10 | 1/1 | 19,774 | 1.72 | 14 | 68 | ~35% |
| 4 | 40 | 1/1 | 20,244 | 1.82 | 35 | 68 | ~35% |

Example 18

Preparation of copolymer macromonomers-dependence of macromonomer purity on ratio of monomer/comonomer.

For Entry 1

A mixture of butyl acrylate (1.0 g), α-methylstyrene (AMS) (0.1 g), n-butyl acetate (10.7 g) and VR-110 (100 ppm) was placed in an ampoule. The reaction mixture was degassed, the ampoule sealed and heated at 150° C. for 40 min.

For Entry 2

A mixture of butyl acrylate (0.5 g), AMS (0.46 g), n-butyl acetate (9.0 g) and VR-110 (100 ppm) was placed in an ampoule. The reaction mixture was degassed, the ampoule sealed and heated at 150° C. for 40 min.

For entry 3

A mixture of butyl acrylate (0.3 g), AMS(0.69 g), n-butyl acetate (8.92 g) and VR-110 (100 ppm) was placed in an ampoule. The reaction mixture was degassed, the ampoule sealed and heated at 150° C. for 40 min.

$^1$H-NMR (acetone-d6): δ7.4–7.4, broad multiplet, 5H, ArH; 5.65–5.4, broad multiplet, 1H, vinylic H; 4.25–3.8, broad multiplet, OCH$_2$; 3.8–3.1, multiplet, OCH$_2$.

For Entry 4

A mixture of butyl acrylate (1.0 g), n-butyl acetate (9.0 g) and VR-110 100 ppm) was placed in an ampoule. The reaction mixture was degassed, the ampoule sealed and heated at 150° C. for 40 min.

TABLE 18

High temperature polymerization of (10 wt % total monomer) BA/AMS at various AMS ratio's with VR-110 (100 ppm) in nBuAc at 150° C.

| Entry | BA/AMS | % AMS | M$_n$ | M$_w$ | PD | % Conv. | % AMS inc. | Macro purity |
|---|---|---|---|---|---|---|---|---|
| 1 | 10/1 | 10 | 3126 | 5021 | 1.61 | 6 | 23 | >90% |
| 2 | 1/1 | 50 | 5721 | 9707 | 1.70 | 4 | 45 | ~65% |
| 3 | 2/5 | 71 | 6240 | 10,343 | 1.66 | 1 | 55 | ~40% |
| 4 | 100% BA | 0 | 1846 | 3343 | 1.81 | 45 | — | >90% |

Example 19

Preparation of functional copolymer macromonomers-dependence of monomer purity on ratio of monomer/comonomer.

For Entry 1

A mixture of butyl acrylate (1.28 g), methyl methacrylate (0.1 g) (MMA), n-butyl acetate (14.9 g) and VR-110 (100 ppm) was placed in an ampoule. action mixture was degassed, the ampoule sealed and heated at 150° C. for 40 min.

For Entry 2

A mixture of butyl acrylate (0.5 g), methyl methacrylate (0.39 g), n-butyl acetate (8.9 g) and VR-110 (100 ppm) was placed in an ampoule. The reaction mixture was degassed, the ampoule sealed and heated at 150° C. for 40 min.

For Entry 3

A mixture of butyl acrylate (0.3 g), methyl methacrylate (0.59 g), n-butyl acetate (8.8 g) and VR-110 (100 ppm) was placed in an ampoule. The reaction mixture was degassed, the ampoule sealed and heated at 150° C. for 40 min.

$^1$H-NMR: δ6.25–6.1, broad multiplet, vinylic H; 5.55–5.45, broad multiplet, vinylic H; 4.2–3.85, broad multiplet, OCH$_2$; 3.65–3.5, broad multiplet, OCH$_3$.

For Entry 4

Poly(butyl acrylate) macro was prepared as in Example 18.

TABLE 19

High temperature polymerization of (10 wt % total monomer) BA/MMA at various MMA ratio's with VR-110 (100 ppm) in nBuAc at 150° C.

| Entry | BA/MMA | % MMA | M$_n$ | M$_w$ | PD | % Conv. | % MMA inc. | Macro purity |
|---|---|---|---|---|---|---|---|---|
| 1 | 10/1 | 10 | 1592 | 3221 | 2.02 | 35 | 13 | >95% |
| 2 | 1/1 | 50 | 5501 | 10346 | 1.88 | 19 | 55 | ~45% |
| 3 | 1/10 | 91 | 10446 | 26231 | 2.51 | 5 | 82 | ~27% |
| 4 | 100% BA | 0 | 1846 | 3343 | 1.81 | 45 | — | >90% |

Example 20

Preparation of poly(acrylic acid) macromonomers under batch microwave conditions.

A stock solution of acrylic acid (5 g) (AA) in N,N-dimethylformamide (96 g) (DMF) and cumene hydroperoxide (750 ppm) was placed in a reactor vessel and heated to 240° C. under microwave irradiation for 20 min.

TABLE 20

Preparation of AA macro. at 4.8 wt % monomer in DMF at 240° C. with cumene hydroperoxide (750 ppm).

| Entry | Time (min) | $\overline{M}_n$ | $\overline{M}_w$ | P.D. | % Conv. | Macro purity |
|---|---|---|---|---|---|---|
| 1 | 20 | 399[1] | 532 | 1.34 | 96.7 | >80% |

[1]Characterized as the poly(methyl acrylate) derivative.

Example 21

Preparation of poly(acrylic acid) macromonomers under batch microwave conditions.

A stock solution of acrylic acid (5 g) in water (100 g) and tert-butyl hydroperoxide (90,000 ppm, this amount was chosen so that approx. 750 ppm of initiator was consumed after 1 hour reaction time) was placed in a thick wall vessel, the solution degassed and heated to 150° C. for 60 min.

TABLE 21

Preparation of AA macro. at 4.8 wt % monomer in water at 150° C. with tertbutyl hydroperoxide (90,000 ppm).

| Entry | Time (min) | $\overline{M}_n$ | $\overline{M}_w$ | P.D. | % Conv. | Macro purity |
|---|---|---|---|---|---|---|
| 1 | 60 | 3458[1] | 16,660 | 4.8 | 97.8 | >75% |

[1]Characterized as the poly(methyl acrylate) derivative.

Example 22

Preparation of poly(acrylic acid) macromonomers under batch microwave conditions.

A stock solution of acrylic acid (5 g) in N,N-dimethylformamide (96 g) and VR-110 (750 ppm) was placed in a thick wall vessel, the solution degassed and heated to 150° C. for 30 min.

TABLE 22

Preparation of AA macro. at 4.8 wt % monomer in DMF at 150° C. with VR-110 (750 ppm).

| Entry | Time (min) | $\overline{M}_n$ | $\overline{M}_w$ | P.D. | % Conv. | Macro purity |
|---|---|---|---|---|---|---|
| 1 | 30 | 835[1] | 1171 | 1.40 | 39.6 | >70% |

[1]Characterized as the poly(methyl acrylate) derivative.

Example 23

Preparation of poly(butyl acrylate/styrene) copolymer macromonomers under batch polymerization conditions.

A mixture of butyl acrylate (0.64 g), styrene (0.52 g), n-butyl acetate (3.8 g) and VR-110 (200 ppm) was placed into each of three ampoules. The reaction mixtures were degassed, the ampoules sealed and heated at 150° C. for the indicated times.

TABLE 23

High temperature polymerization of (20 wt % monomer) BA/Sty (1:1) with VR-110 (200 ppm) in nBuAc at 150° C.

| Entry | Time (min) | $M_n$ | PD | % conv | % Sty inc. |
|---|---|---|---|---|---|
| 1 | 10 | 16,487 | 1.79 | 9 | — |
| 2 | 20 | 16,970 | 1.78 | 14.5 | — |
| 3 | 40 | 15,839 | 1.73 | 20.5 | 60 |

Example 24

Preparation of poly(butyl acrylate/styrene) copolymer macromonomers under batch polymerization conditions.

For Entry 1

A mixture of butyl acrylate (0.64 g), styrene (0.52 g), n-butyl acetate (8.8 g) and VR-110 (200 ppm) was placed in an ampoule. The reaction mixture was degassed, the ampoule sealed and heated at 150° C. for 40 min.

For Entry 2

A mixture of butyl acrylate (1.15 g), styrene (0.1 g), n-butyl acetate (8.8 g) and VR-110 (200 ppm) was placed in an ampoule. The reaction mixture was degassed, the ampoule sealed and heated at 150° C. for 40 min.

For Entry 3

A mixture of butyl acrylate (0.13 g), styrene (0.94 g), n-butyl acetate (8.8 g) and VR-110 (200 ppm) was placed in an ampoule. The reaction mixture was degassed, the ampoule sealed and heated at 150° C. for 40 min.

TABLE 24

High temperature polymerization of BA/Sty with VR-110 (200 ppm) in nBuAc at 150° C.

| Entry | [Mon] wt. % | BA/Sty | $M_n^1$ | PD | % Conv. | % Sty inc. |
|---|---|---|---|---|---|---|
| 1 | 11.4 | 1/1 | 6343 | 2.05 | 20 | 60 |
| 2 | 12 | 10/1 | 2340 | 2.62 | 18 | 23 |
| 3 | 10.6 | 1/10 | 15,839 | 1.75 | 16 | 88 |

[1]In all cases, butyl methacrylate (BMA) & AMS double bonds were detected in the $^1$H-NMR spectrum.

Example 25

Preparation of poly(butyl acrylate/hydroxyethyl acrylate) copolymer macromonomers under batch polymerization conditions.

For Entry 1

A mixture of butyl acrylate (1.15 g), hydroxyethyl acrylate (0.17 g), n-butyl acetate (8.8 g) and VR-110 (200 ppm) was placed in an ampoule. The reaction mixture was degassed, the ampoule sealed and heated at 150° C. for 40 min.

For Entry 2

A mixture of butyl acrylate (0.64 g), hydroxyethyl acrylate (0.58 g), n-butyl acetate (8.8 g) and VR-110 (200 ppm) was placed in an ampoule. The reaction mixture was degassed, the ampoule sealed and heated at 150° C. for 40 min.

TABLE 25

High temperature polymerization of BA/HEA with VR-110 (200 ppm) in nBuAc at 150° C.

| Entry | [Mon] wt. % | BA/HEA | $M_n^1$ | PD | % Conv. | % HEA inc. |
|---|---|---|---|---|---|---|
| 1 | 12.8 | 10/1 | 2495 | 2.03 | 59 | 12 |
| 2 | 12 | 1/1 | 3824 | 2.33 | 65 | 57 |

Example 26

Preparation of poly(butyl acrylatehydroxyethyl acrylate) copolymer macromonomers under batch polymerization conditions.

A mixture of butyl acrylate (0.64 g), hydroxyethyl acrylate (0.58 g), n-butyl acetate (3.8 g) and VR-110 (200 ppm) was placed into each of three ampoules. The reaction mixtures were degassed, the ampoules sealed and heated at 150° C. for the indicated times.

TABLE 26

High temperature polymerization of (20 wt % monomer) BA/HEA (1:1) with VR-110 (200 ppm) in nBuAc at 150° C.

| Entry | Time (min) | $M_n^1$ | PD | % Conv. | % HEA inc.[1] |
|---|---|---|---|---|---|
| 1 | 10 | 6763 | 1.61 | 48 | — |
| 2 | 20 | 8077 | 2.74 | 64 | — |
| 3 | 40 | 7631 | 3.06 | 68 | 58 |

[1]Calc. as HEA/[HEA + BA] X100.

Example 27

Preparation of poly(butyl acrylate/methacrylic acid) copolymer macromonomer under batch polymerization conditions.

A mixture of butyl acrylate (1.28 g), methacrylic acid (0.17 g) (MAA), n-butyl acetate (7.0 g) and VR-110 (200 ppm) was placed into each of two ampoules. eaction mixtures were degassed, the ampoules sealed and heated at 150° C. for 10 min and 40 min.

TABLE 27

High temperature polymerization of (20 wt % monomer) BA/MAA (5:1) with VR-110 (200 ppm) in nBUAc at 150° C.

| Entry | Time min. | $M_n$ | $M_w$ | PD | % Conv. | % MAA inc. | Macro purity |
|---|---|---|---|---|---|---|---|
| 1 | 10 | 3785 | 6106 | 1.61 | 19 | 66 | >80% |
| 2 | 40 | 3661 | 6127 | 1.67 | 64 | 65 | >80% |

Example 28

Preparation of poly(butyl acrylate/glycidyl methacrylate) copolymer monomers under batch polymerization conditions.

A mixture of butyl acrylate (1.28 g), glycidyl methacrylate (0.15 g), n-butyl acetate (6.9 g) and VR-110 (200 ppm) was placed into each of two ampoules. The reaction mixtures were degassed, the ampoules sealed and heated at 150° C. for 10 min and 40 min.

TABLE 28

High temperature polymerization of (17 wt % monomer) BA/GMA (10:1) with VR-110 (200 ppm) in nBUAc at 150° C.

| Entry | Time (min) | $M_n$ | $M_w$ | PD | % Conv. | % GMA inc. | Macro purity |
|---|---|---|---|---|---|---|---|
| 1 | 10 | 3311 | 7825 | 2.36 | 43 | 11 | >95% |
| 2 | 40 | 2687 | 6211 | 2.31 | 69 | 8 | >95% |

Example 29

Preparation of low molecular weight poly(butyl acrylate) macromonomer under batch microwave conditions.

A stock solution of butyl acrylate (5 g) in N,N-dimethylformamide (100 g) and cumene hydroperoxide (100 ppm) was placed in a reactor vessel and heated to 240° C. under microwave irradiation for 20 min.

TABLE 29

Preparation of BA macro. 4.8 wt % monomer in DMF at 240° C. with cumene hydroperoxide (100 ppm).

| Entry | Time (min) | $\overline{M}_n$ | $\overline{M}_w$ | P.D. | % Conv. | Macro purity |
|---|---|---|---|---|---|---|
| 1 | 20 | 667 | 806 | 1.21 | 40.6 | ~40% |

Example 30

Preparation of low molecular weight poly(butyl acrylate) macromonomer under batch microwave conditions.

A stock solution of butyl acrylate (1.6 g) in N,N-dimethylformamide (100 g) and cumene hydroperoxide (100 ppm) was placed in a reactor vessel and heated to 240° C. under microwave irradiation for 20 min.

TABLE 30

BA polymerization (1.5 wt % monomer) in DMF with cumene hydroperoxide (200 ppm) at 240° C. for 20 min.

| React. Time | $M_n$ | $M_w$ | PD | % Conv. | Macro purity |
|---|---|---|---|---|---|
| 20 min | 557 | 694 | 1.25 | 32.2 | >60% |

Example 31

Preparation of poly(butyl acrylate)-graft-methyl acrylate using poly(butyl acrylate) macromonomer.

1. Preparation of poly(butyl acrylate) macromonomer

To a three neck round bottom flask comprising stirring bar, condenser, nitrogen inlet and outlet tubes was added n-amyl acetate (160 mL). Degassing was performed by bubbling nitrogen gas through the solvent for 40 min. The vessel was brought to 150° C. and n-butyl acrylate (20 g, 0.2 mol) was added. Degassing was continued for a further 5 min before adding VR-160 initiator (18 mg) followed by raising the nitrogen flow to above solvent level. Gentle reflux was continued for a further 8 hours. The volatiles were removed in vacuo to give poly(butyl acrylate) macromonomer; (19 g, 95%) $M_n$ 2250, PD 2.07.

2. Preparation of polybutyl acrylate)-graft methyl acrylate

To a 100 mL reactor vessel fitted with a stirring bar, condenser, nitrogen inlet and outlet tubes and thermocouple was added an initial charge of poly(butyl acrylate) macromonomer (5 g), acetone (20 g) and methyl acrylate (24.5 g). The mixture was degassed by nitrogen bubbling for 40 min. The mixture was brought to gentle reflux and a second solution of VAZO®-52 (119 mg) in acetone (1 g) was added. After 15 min the reaction mixture turned viscous and an additional aliquot of acetone (20 mL) was added to aid in the stirring. The reaction mixture was held at reflux for a total of 2 hours. A further aliquot of acetone (5 mL) was added followed by a solution of VAZO®-52 (19 mg) in acetone (1 g). After a further 2 hours at reflux a solution of VAZO®-67 (10 mg) in acetone (1 g) was added and the mixture refluxed for a further 3 hours. The volatiles were removed in vacuo to give a soft glassy solid (32 g). $M_n$ 127,705 ; PD 2.77. $^1$H-NMR and GPC data show that the poly(butyl acrylate) macromonomer has been consumed.

Example 32

Preparation of isobornyl acrylate macromonomer under batch polymerization conditions.

A 50% mixture of isobornyl acrylate and dicloroethane containing 0.8% of VAZO®-88 was placed in an ampoule, degassed and heated at 90° C. for 48 hours. The macromonomer of poly(isobornyl acrylate) gave a GPC (in THF) Mn=9670. $^1$H-NMR (acetone-d6):6.1 and 5.5, broad singlets, 2H, vinylic H.

Example 33

This example illustrates the effect of feed time in the synthesis of a butyl acrylate macromonomer under starved feed conditions. The following constituents were charged to a reaction vessel equipped with a heating mantle, reflux condenser, thermometer, nitrogen inlet, and stirrer:

|  | Parts by Weight |
| --- | --- |
| Portion 1 | |
| Ethoxy ethylpropionate (EEP) | 300.0 |
| Portion 2 | |
| Butyl acrylate | 800.0 |
| Ethoxy ethylpropionate | 900.0 |
| VR-110 | 0.08 |
| Total | 2000.08 |

Portion 1 was charged into the reaction vessel, deoxygenated by bubbling nitrogen through the solution for 15 minutes and then heated to reflux under a nitrogen blanket. Portion 2 was charged to a flask and deoxygenated by bubbling nitrogen through the mixture for 15 minutes. The mixture was then added to the vessel containing Portion I over three time intervals as shown in Table 31.

TABLE 31

Effect of feed time in the high temperature polymerization of BA under starved feed conditions.

| Entry | Feed time (hrs) | % Conv. | $M_n$ | PD |
| --- | --- | --- | --- | --- |
| 1 | 2 | 68 | 3667 | 2.12 |
| 2 | 4 | 90 | 3300 | 2.13 |
| 3 | 6 | 88 | 2612 | 1.96 |

Example 34

This example illustrates the effect of initiator level in the synthesis of a butyl acrylate (BA) macromonomer under starved feed conditions. The following constituents were charged to a reaction vessel equipped with a heating mantle, reflux condenser, thermometer, nitrogen inlet, and stirrer:

|  | Parts by Weight |
| --- | --- |
| Portion 1 | |
| Ethoxy ethylpropionate | 300.0 |
| Portion 2 | |
| Butyl acrylate | 800.0 |
| Ethoxy ethylpropionate | 900.0 |
| VR-110 | see Table 32 |
| Total | 2000.08 |

Portion 1 was charged into the reaction vessel, deoxygenated by bubbling nitrogen through the solution for 15 minutes and then heated to reflux under a nitrogen blanket. Portion 2 was charged to a flask and deoxygenated by bubbling nitrogen through the mixture for 15 minutes. The mixture was then added to the vessel containing Portion 1 over 4 hours.

TABLE 32

Effect of initiator concentration in the high temperature polymerization of BA under starved feed conditions.

| Entry | Initiator conc. | % Conv. | $M_n$ | PD |
| --- | --- | --- | --- | --- |
| 1 | 100 ppm | 90 | 3300 | 2.13 |
| 2 | 200 ppm | 86 | 2828 | 1.80 |
| 3 | 300 ppm | 83 | 2653 | 1.76 |
| 4 | 500 ppm | 88 | 2507 | 1.69 |

Example 35

This example illustrates the effect of reaction temperature in the synthesis of a butyl acrylate macromonomer under starved feed conditions. The following constituents were charged to a reaction vessel equipped with a heating mantle, reflux condenser, thermometer, nitrogen inlet, and stirrer:

|  | Parts by Weight |
| --- | --- |
| Portion 1 | |
| Solvent | 300.0 |
| Portion 2 | |
| Monomer | 800.0 |
| Solvent | 900.0 |
| VR-110 | 0.08 |
| Total | 2000.08 |

Portion 1 was charged into the reaction vessel, deoxygenated by bubbling nitrogen through the solution for 15 minutes and then heated to reflux under a nitrogen blanket. Portion 2 was charged to a flask and deoxygenated by bubbling nitrogen through the mixture for 15 minutes. The mixture was then added to the vessel containing Portion 1 over 4 hours.

TABLE 33

Effect of reaction temperature in the high temperature polymerization of BA and 2-ethylhexyl acrylate (EHA) under starved feed conditions.

| Entry | Monomer | Solvent | Temp °C. | % Conv. | $M_n$ | PD |
|---|---|---|---|---|---|---|
| 1 | BA | EEP | 162 | 90 | 3300 | 2.13 |
| 2 | BA | amyl acetate | 147 | 70 | 4200 | 2.44 |
| 3 | EHA | EEP | 162 | 81 | 2157 | 1.40 |
| 4 | EHA | amyl acetate | 147 | 76 | 2956 | 1.58 |

What is claimed is:

1. A process for the synthesis of polymers of the general formula (1):

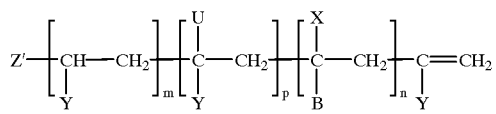

comprising
(A) contacting:
(a) $CH_2\!=\!CHY$;
(b) optionally, $CH_2\!=\!CXB$; and
(c) free radicals, produced from a free radical source;
wherein:
X is independently selected from the group consisting of halogen, and optionally substituted $C_1$–$C_4$ alkyl wherein the substituents are independently selected from the group consisting of hydroxy, alkoxy, aryloxy (OR), carboxy, acyloxy, aroyloxy ($O_2CR$), alkoxycarbonyl, and aryloxy-carbonyl ($CO_2R$);
Y is independently selected from the group consisting of R, $CO_2H$, $CO_2R$, COR, CN, $CONH_2$, CONHR, $CONR_2$, $O_2CR$, OR, and halogen;
B is selected from the group consisting of R, $CO_2H$, $CO_2R$, COR, CN, $CONH_2$, CONHR, $CONR_2$, $O_2CR$, OR, halogen, and a polymer chain;
R is selected from the group consisting of optionally substituted $C_1$–$C_{18}$ alkyl, $C_2$–$C_{18}$ alkenyl, aryl, heterocyclyl, aralkyl, and alkaryl wherein the substituents are independently selected from the group that consists of epoxy, hydroxy, alkoxy, acyl, acyloxy, carboxy (and salts), sulfonic acid (and salts), alkoxycarbonyl, aryloxy-carbonyl, isocyanato, cyano, silyl, halo, and dialkylamino;
Z is selected from the group consisting of H and a free radical initiator-derived fragment of optionally substituted alkyl, cycloalkyl, aryl, aralkyl, alkaryl, organosilyl, alkoxyalkyl, alkoxyaryl, hydroxy, hydroperoxy, alkylperoxy, alkoxy, or aroyloxy groups wherein substituent(s) are selected from the group consisting of R, OR, $O_2CR$, halogen, $CO_2H$ (and salts), $CO_2R$, CN, $CONH_2$, CONHR, $CONR_2$, and sulfate,

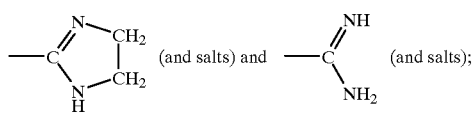

$m \geq 1$;
$n \geq 0$;
$p \geq 0$;
and when one or both of m and n are greater than 1, the repeat units are the same or different;
the $[CH_2\!-\!CUY]_p$ units contain branch point, U, and is derived from structure (1) whereby U is of random structure (2):

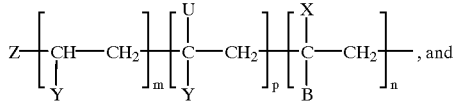

(B) controlling polymer quality adjusting the following variables:
(i) increasing the proportion of vinyl terminated polymer by increasing the molar ratio of (a)/(b);
(ii) increasing the proportion of vinyl terminated polymer by decreasing the molar ratio of (c)/[(a)+(b)];
(iii) controlling the degree of branching (value of p) as follows:
(d) decreasing p by increasing temperature;
(e) decreasing p by decreasing monomer concentration;
(f) increasing p by increasing conversion;
(iv) controlling the molecular weight of the polymer as follows:
(g) decreasing molecular weight by decreasing monomer concentration; and
(h) decreasing molecular weight by increasing temperature.

2. A process according to claim 1 for producing a homopolymer of general structure:

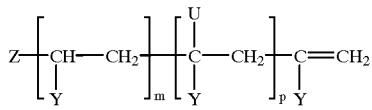

wherein
Y is selected from the group consisting of R, $CO_2H$, $CO_2R$, COR, CN, $CONH_2$, CONHR, $CONR_2$, $O_2CR$, OR and halogen; and
the $[CH_2\!-\!CUY]_p$ units represent a branchpoint and is derived from structure (2) whereby U is of structure:

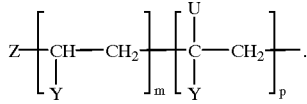

3. A process according to claim 1 for producing a random copolymer of general structure:

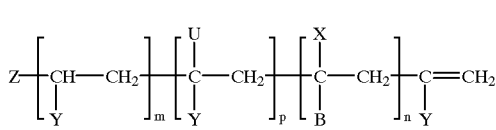

wherein:
$n \geq 1$;
Y is selected from the group consisting of R, $CO_2H$, $CO_2R$, COR, CN, $CONH_2$, CONHR, $CONR_2$, $O_2CR$, OR, and halogen; and B is independently selected from the group consisting of R, $CO_2H$, $CO_2R$, COR, CN, $CONH_2$, CONHR, $CONR_2$, $O_2CR$, OR, halogen, and a polymer chain.

4. A process according to claim 1 comprising controlling polymer quality by step (B)(i).

5. A process according to claim 1 comprising controlling polymer quality by step (B)(ii).

6. A process according to claim 1 comprising controlling polymer quality by step (B)(iii).

7. A process according to claim 6 employing step (B)(iii)(d).

8. A process according to claim 6 employing step (B)(iii)(e).

9. A process according to claim 6 employing step (B)(iii)(f).

10. A process according to claim 1 comprising controlling polymer quality by controlling molecular weight employing step (B)(iv).

11. A process according to claim 10 employing step (B)(iv)(g).

12. A process according to claim 10 employing step (B)(iv)(h).

* * * * *